(12) United States Patent
Oak

(10) Patent No.: US 8,018,922 B2
(45) Date of Patent: Sep. 13, 2011

(54) NETWORK INTERFACE DEVICE

(75) Inventor: Seung-soo Oak, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1596 days.

(21) Appl. No.: 10/833,113

(22) Filed: Apr. 28, 2004

(65) Prior Publication Data

US 2004/0266479 A1   Dec. 30, 2004

(30) Foreign Application Priority Data

Jun. 24, 2003  (KR) .................. 10-2003-0041253

(51) Int. Cl.
  *H04Q 11/00* (2006.01)
  *H04L 12/28* (2006.01)
  *G06F 15/16* (2006.01)
(52) U.S. Cl. .................. 370/359; 370/419; 709/250
(58) Field of Classification Search .................. 370/359, 370/419, 463; 709/220, 250
See application file for complete search history.

(56) References Cited

U.S. PATENT DOCUMENTS

| | | | | |
|---|---|---|---|---|
| 5,748,443 A * | 5/1998 | Flint et al. | ...................... | 361/686 |
| 6,043,902 A * | 3/2000 | Sato | .................. | 358/434 |
| 6,091,732 A * | 7/2000 | Alexander et al. | ............ | 370/401 |
| 6,542,358 B1* | 4/2003 | Kunz et al. | ..................... | 361/686 |
| 6,681,259 B1* | 1/2004 | Lemilainen et al. | .......... | 709/250 |
| 6,868,462 B2* | 3/2005 | Kolodziej | ...................... | 710/62 |
| 7,016,360 B1* | 3/2006 | Dong | ............................. | 370/401 |
| 7,227,838 B1* | 6/2007 | O'Riordan | ..................... | 370/219 |
| 7,249,183 B1* | 7/2007 | Subbiah | ........................ | 709/227 |
| 7,433,346 B2* | 10/2008 | Nah | ................ | 370/342 |
| 2003/0185233 A1* | 10/2003 | Ji et al. | .......................... | 370/466 |
| 2003/0219033 A1* | 11/2003 | Silvester | ....................... | 370/469 |
| 2003/0221034 A1* | 11/2003 | Cheng | ........................... | 710/301 |
| 2004/0001470 A1* | 1/2004 | Chen | .............................. | 370/338 |
| 2004/0023642 A1* | 2/2004 | Tezuka | .......................... | 455/411 |
| 2004/0198430 A1* | 10/2004 | Moriyama et al. | ......... | 455/556.1 |
| 2004/0266424 A1* | 12/2004 | Park et al. | .................. | 455/426.1 |
| 2005/0052679 A1* | 3/2005 | Green et al. | .................. | 358/1.14 |

FOREIGN PATENT DOCUMENTS

| | | |
|---|---|---|
| CN | 1380600 | 11/2002 |
| JP | 11-045137 | * 2/1999 |
| JP | 11-103331 | 4/1999 |
| JP | 2000-75974 | 3/2000 |
| KR | 1020020028479 | 4/2002 |
| KR | 1020030035228 | 9/2003 |

OTHER PUBLICATIONS

Japanese Office Action dated Jan. 21, 2008 issued in JP 2004-185297.
Chinese Office Action dated Feb. 15, 2008 issued in CN 2004-100472992.

* cited by examiner

*Primary Examiner* — Dang Ton
*Assistant Examiner* — Ryan Kavleski
(74) *Attorney, Agent, or Firm* — Stanzione & Kim, LLP

(57) ABSTRACT

A network interface device having a first board to connect with a wired network to provide signal exchange, which is mounted in a network electronic device, a second board to connect with a wireless network to provide signal exchange, and a first and a second link portion provided at the first and the second boards to removably connect the first and the second boards, respectively.

21 Claims, 6 Drawing Sheets

NETWORK INTERFACE DEVICE

CROSS-REFERENCE TO RELATED APPLICATIONS

This application claims the benefit of Korean Patent Application No. 2003-41253 filed Jun. 24, 2003, in the Korean Intellectual Property Office, the disclosure of which is incorporated herein by reference.

BACKGROUND OF THE INVENTION

1. Field of the Invention

The present invention relates to a network interface device, and more particularly, to a network interface device which is adapted to electronic devices, such as computers and printers, to connect them to wired or wireless networks.

2. Description of the Related Art

Generally, a network interface device is installed in a network electronic device, such as a computer and a printer, to connect the electronic device to wired, or wireless networks.

FIGS. 1 and 2 show one example of the network electronic device, i.e., a printer. It is common that a printer 100, as shown in FIGS. 1 and 2, is connected to a network through the employment of network interface devices 150, 150' which are separately purchased. In this case, the network interface devices 150 and 150' are removably mounted on a mounting portion 115 of the printer 100, while being selectively blocked from the outside by a side cover 110, and the network interface devices 150 and 150' usually include a board 151, a bracket 153 and a connecting terminal 155.

The board 151 is usually a printed circuit board (PCB) having predetermined circuits printed thereon, and for the signal exchange with wired or wireless networks, there are a plurality of electronic elements P (see FIG. 3) equipped with a data processing unit (not shown) and a memory (not shown) connected with the predetermined circuits on the board 151. On one side of the board 151, there is the connecting terminal 155 removably mounted on a connecting slot 118 of the printer 100. With the connection between the connecting terminal 155 and the connecting slot 118, the data processing unit (not shown) is connected with a printer control unit 120 (FIG. 4) of the printer 100 so as to mutually exchange signals.

Meanwhile, the bracket 153 is to fix the network interface devices 150 and 150' to the printer 100, and with the connection between the connecting slot 118 and the connecting terminal 155, the bracket 153 is fixed to the printer 100 by fasteners S. The bracket 153 also has connecting ports 157 and 158, which connect the data processing unit (not shown) to the wired or wireless networks. The connecting port 157 for the wired network is connected with a connecting means such as a LAN cable for a wired network, while the connecting port 158 for a wireless network is connected with separate components such as an antenna A or a light receiving device (not shown) corresponding to the wireless signal transmission/reception mode. If a wireless network interface device having a built-in antenna such as PCMCIA therein is used, the connecting port 158 for a wireless network may be omitted.

The network interface devices 150 and 150' constructed as described above are mainly characterized into two uses: 1) for use in a wireless network such as a wireless LAN and an IRDA; and 2) for use in a wired network such as Ethernet, which are respectively available on the market.

Accordingly, a plurality of connecting slots 118 also need to be prepared in the printer 100 for the mounting of the plurality of network interface devices 150 and 150'. As a result, the printer 100 usually becomes large-sized, and manufacturing costs also increase.

Additionally, in order for the electronic devices having the two types of network interface devices 150 and 150' to be connected to the Internet, different Internet protocol (IP) addresses have to be allocated to the network interface devices 150 and 150' and managed, respectively. As a plurality of IP addresses are allocated and managed for one electronic device, constructing a network costs considerably.

Still further, because the plurality of network interface devices 150 and 150' each keep physical addresses, i.e., Media Access Control (MAC) addresses, it is difficult to manage the a plurality of IP addresses or the physical addresses when a plurality of network interface devices 150 and 150' are installed together in a single electronic device.

SUMMARY OF THE INVENTION

In an effort to resolve the problems as mentioned above, an aspect of the present invention is to provide a network interface device which enables connecting of network electronic devices both to wired and wireless networks.

Additional aspects and advantages of the invention will be set forth in part in the description which follows and, in part, will be obvious from the description, or may be learned by practice of the invention.

The foregoing and/or other aspects of the present invention are achieved by providing a network interface device including a first board and a second board. The first board comprises a first data processing unit which is connected with one among a wireless network and a wired network to provide signal exchange, a first connecting terminal which is removably connected with a network electronic device to connect the network electronic device with the first data processing unit to provide signal exchange, and a first link portion connected with the first connecting terminal to provide signal exchange. The second board includes a second data processing unit which is connected with one among the networks to provide signal exchange, and a second link portion which is connected with the second data processing unit to provide signal exchange, and also connected with the first link portion to provide signal exchange.

As one or both of the wired and wireless networks can be connected to the network electronic device through a shared network interface apparatus which is provided in a single connecting slot, the network electronic device can be compact-sized, and can be provided for the respective uses at a reduced cost.

In an aspect of the present invention, the first data processing unit is connected with the wired network and the second data processing unit is connected with the wireless network.

In another aspect of the present invention, the first link portion comprises a connecting hole formed in the first board, and the second link portion comprises a connecting protrusion formed on the second board to provide a connection with the connecting hole, such that the first and the second boards are connected with each other with the connection of the connecting hole and the connecting protrusion to provide mutual signal exchange.

Further provided is a fixing unit to prevent movement of the second board with respect to the first board during the connecting of the first and the second boards. The fixing unit comprises a fixing bracket which is removably connected to the first board, and the second board is pressed toward the first board by the fixing bracket.

Meanwhile, electronic elements are mounted on a side of the first board to provide signal exchange with a network, which is connected with the first data processing unit, and the first link portion is installed on the other side of the first board.

The first board comprises a first port connected with the first data processing unit to connect the first data processing unit to one of the networks, and at least one of the first and the second boards has a connecting port to connect with the other network, which is connected with the second data processing unit.

The connecting port comprises a second port which is installed in the first board to selectively connect with a network which is connected with the second data processing unit, and the second data processing unit is connected to the second port through the first and the second link portions.

The second port and the first link portion can be connected via the first data processing unit, and the second port and the second data processing unit can be directly connected through a signal transmission/reception cable to provide signal exchange.

The network electronic device refers to a printer, and the first data processing unit preferably includes an auxiliary control unit to convert signals from the networks into print control signals and output to the first connecting terminal.

Additionally, it is preferable that the auxiliary control unit converts the signals from the second data processing unit into print control signals and output to the first connecting terminal.

Meanwhile, the first data processing unit comprises a memory to store a physical address of the first board, and controls the second data processing unit such that the physical address stored in the memory can be allocated as the physical address of the second board during the connection of the first and the second link portions.

The first data processing unit further comprises an address management unit to manage an IP address allocated to the first board, and the address management unit manages the second data processing unit such that the IP address which is the same as that of the first board can be allocated to the second board when the first and the second link portions are connected with each other.

The second board further comprises a second connecting terminal which is removably connected to a second network electronic device which is different from the network electronic device in which the first board is mounted, the second connecting terminal being connected with the second data processing unit, and a third port to connect with a network which is connected with the second data processing unit.

Accordingly, not only the first board, but also the second board is capable of being provided in the network electronic device and performing network interface functions independently.

The first and the second data processing units each comprise a memory to store a physical address corresponding to the first and the second boards, and the first data processing unit controls the second data processing unit such that when the first board is mounted in the network electronic device in connection with the second board, the physical address of the second board is identical with the physical address of the first board.

The first and the second data processing units each comprise an address management unit to manage such that the first and the second boards are allocated with different IP addresses, respectively, and the first data processing unit controls the second data processing unit such that when the first board is mounted in the network electronic device in connection with the second board, the IP address allocated to the second board is identical with the IP address allocated to the first board.

The connecting port comprises a second port which is installed in the first board to removably connect with one of the networks which is connected with the second data processing unit, and the second data processing unit is connected with the other network through the second port when the first board is mounted in the network electronic device in connection with the second board.

The network electronic device connected with the first board, and the network electronic device connected with the second board, preferably exchange signals with corresponding boards according to different protocols.

The foregoing and/or other aspects of the present invention are also achieved by providing a network interface device to facilitate transfer of data between plural communication networks and a terminal device, comprising: a first circuit board including a first data processing unit to receive wired data from at least one external wired communication network and to process the wired data to produce processed wired data, and a first link portion; a second circuit board including: a second data processing unit to receive wireless data from at least one external wireless communication network and to process the wireless data to produce processed wireless data, and a second link portion; and a connecting terminal to receive at least one of the processed wired data and at least one of the wireless processed data and to transmit the at least one of the processed wired data and/or the at least one of the wireless processed data to the terminal device, wherein the first link portion and the second link portion are capable of connecting to each other to establish a communication link between the first circuit board and the second circuit board, and the connecting terminal receives both the at least one of the processed wired data and the at least one of the wireless processed data when the communication link is established.

The foregoing and/or other aspects of the present invention are also achieved by providing a network interface device to facilitate an exchange of signals between one or more communication networks and a network electronic device having a slot, comprising: a first board having a bracket removably attachable to the slot of the network electronic device, the first board comprising a first data processing unit to provide signal exchange between the network electronic device and one of the communication networks, a first connecting terminal connected to the first data processing unit and connectable to the network electronic device, a first connecting port connected to the first data processing unit and connectable to one of the communication networks, and a first link portion connected to the first data processing unit and connectable to the other one of the communication networks.

In an aspect of the above network interface device, there is further provided: a second board removably attached to the first board, the second board comprising a second data processing unit to provide signal exchange between the network electronic device and the other one of the communication networks through the first data processing unit, a second link portion connected to the second data processing unit and connectable to the first link portion of the first board, and a second connecting port connected to the second data processing unit and connectable to the other one of the communication networks.

The foregoing and/or other aspects of the present invention are also achieved by providing a network interface device to facilitate an exchange of signals between one or more communication networks and a network electronic device having a slot connected to a bracket of a first board of the network interface device, comprising: a second board detachably attached to the first board, comprising a data processing unit to provide signal exchange, a link portion connected to the data processing unit and connectable to the first board, and a connecting port connected to the data processing unit and connectable to the one of the communication networks, wherein the second board does not have a bracket to be connected the the slot.

BRIEF DESCRIPTION OF THE DRAWINGS

These and other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
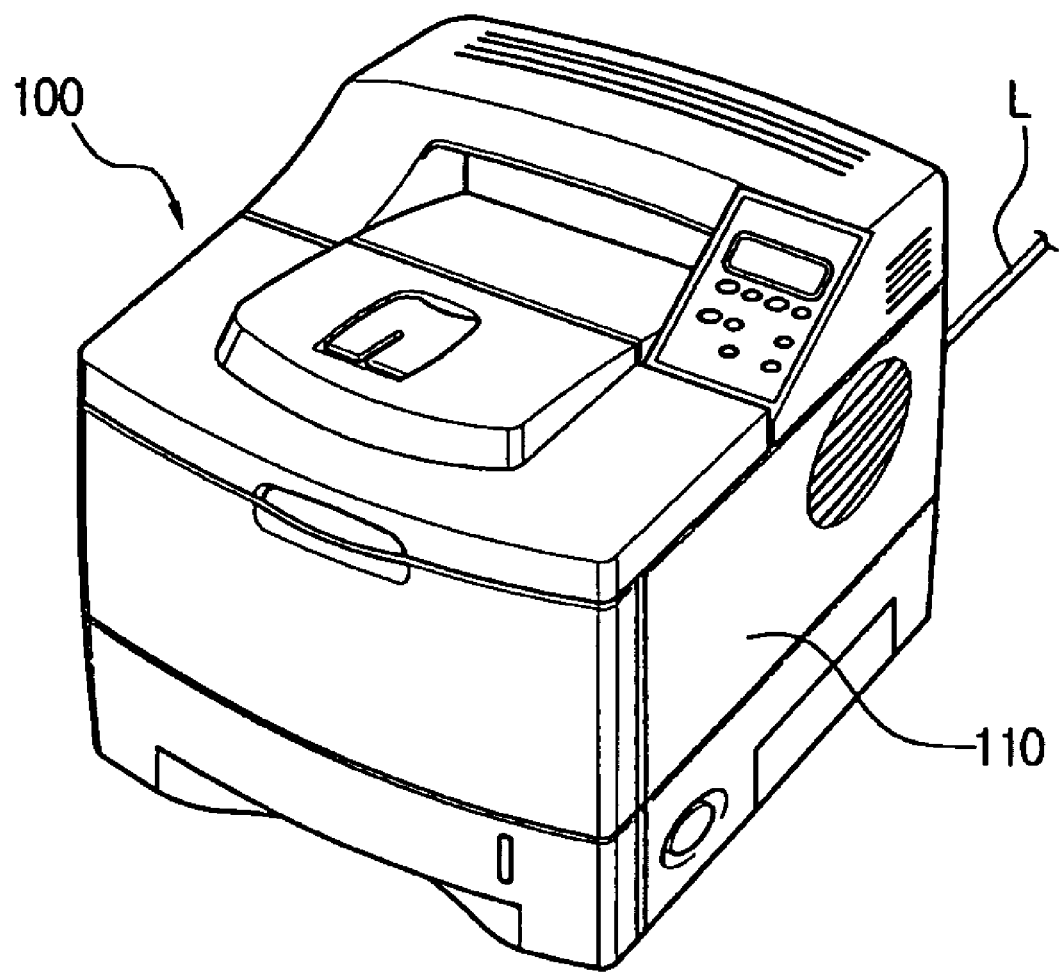
FIG. 1 is a perspective view of a printer as one example of conventional network electronic device.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
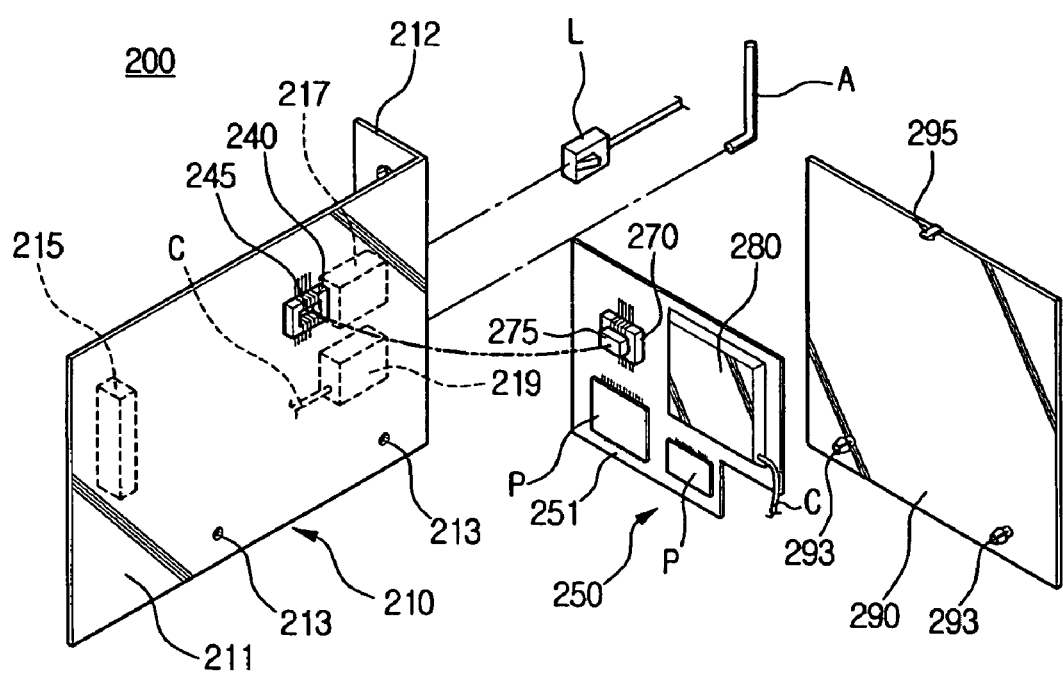
FIG. 3 is an exploded perspective view of a network interface device according to an embodiment of the present invention.
Figure 4:
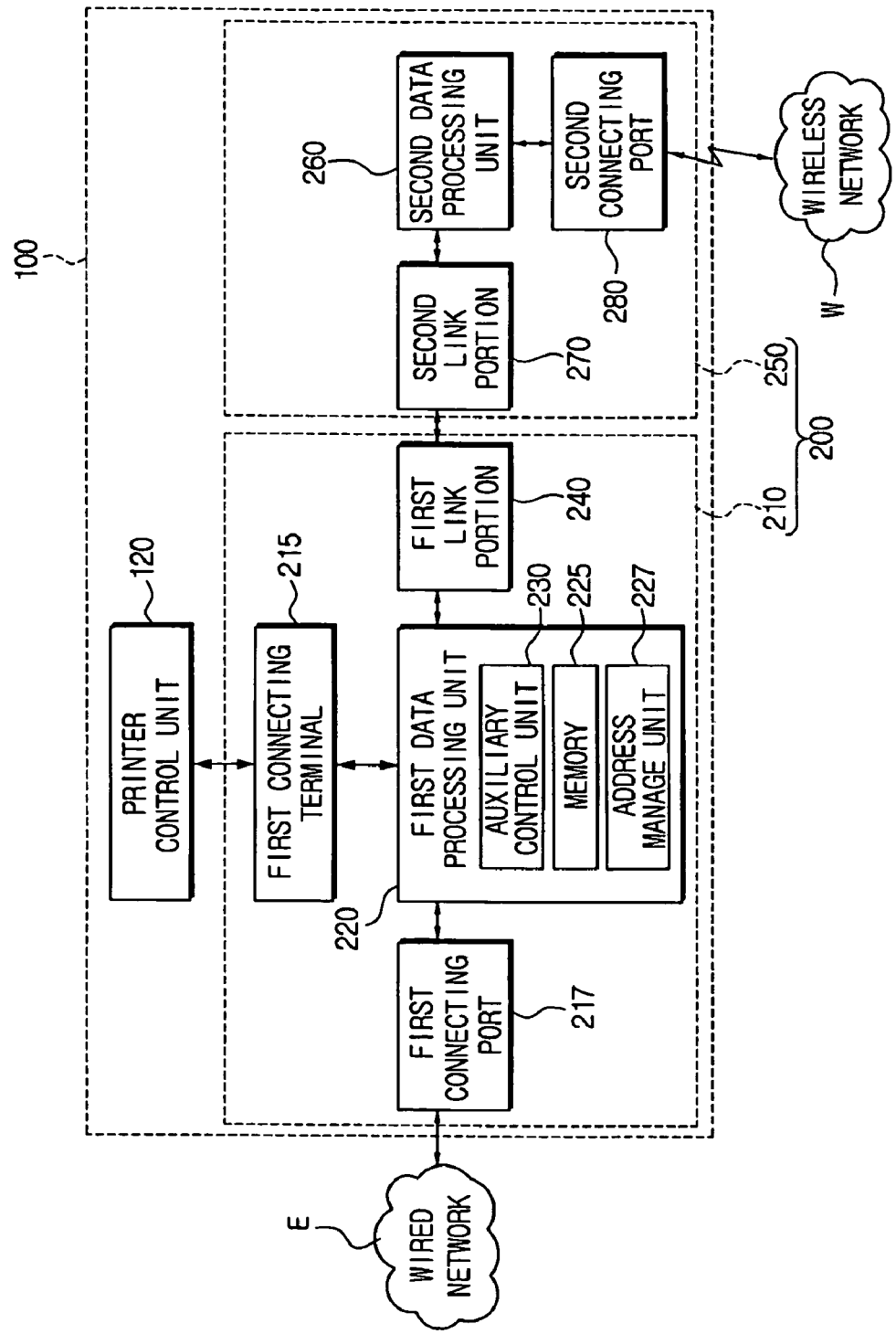
FIG. 4 is a block diagram illustrating the network interface device of FIG. 3.

FIG. 3 shows an appearance of a network interface device 200 according to an embodiment of the present invention, and FIG. 4 shows the structure of the network interface device 200 according to the embodiment of FIG. 3.

Referring to FIGS. 3 and 4, the network interface device 200 according to this embodiment of the present invention comprises a first board 210 and a second board 250. The first and the second boards 210 and 250, respectively, are removably connected with each other, and being connected, a mutual signal exchange is enabled.

The first board 210 comprises a first data processing unit 220, a first connecting terminal 215, a first link portion 240 and a first connecting port 217. The first data processing unit 220 is generally formed by a plurality of electrical components which are mounted on a circuit board 211 of the first board 210, i.e., mounted on a side (not-shown) of the circuit board 211 of FIG. 3, and is constructed to be able to transmit and receive signals with a wireless network W and a wired network E. According to the present embodiment, the first data processing unit 220 is constructed to transmit and receive signals with the wired network E.

Figure 2:
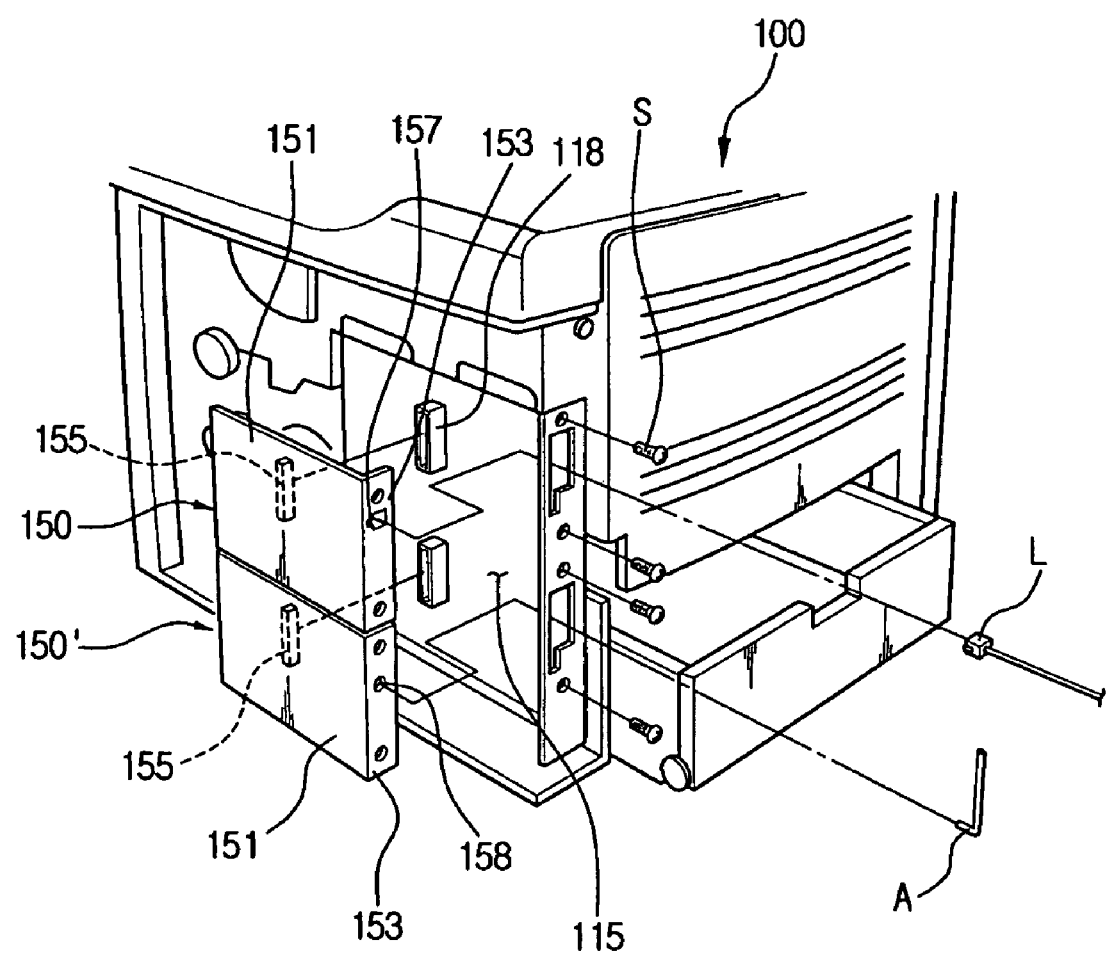
FIG. 2 is a view illustrating a method of mounting a conventional network interface device onto a network electronic device.

The first connecting terminal 215 and the first connecting port 217 are to connect the first data processing unit 220 to the printer 100 (FIG. 1) and to the wired network E. According to this embodiment, the first connecting terminal 215 is removably installed in a connecting slot 118 similar to the connecting slot illustrated in FIG. 2, which is provided inside the printer 100. The first connecting port 217 is also removably connected to another physical connecting unit, such as a LAN cable, which is connected with other network electronic devices. It is an aspect of this embodiment that the first connecting port 217 is prepared on a bracket 212 and exposed to an outside portion of the printer 100 with the mounting of the first board 210. The bracket 212 is constructed in the same manner as the conventional bracket 153 (FIG. 2), and therefore, a detailed description thereof will be omitted. Meanwhile, the first link portion 240 is to connect the first board 210 with the second board 250. Additionally, an auxiliary control unit 230 is provided to the network interface device to use with the printer 100 according to the present embodiment. The first link portion 240 and the auxiliary control unit 230 will be described in detail later.

The second board 250 comprises a second data processing unit 260 and a second link portion 270. The second data processing unit 260 is connected to the wireless network W and the wired network E through the plurality of electronic components P mounted on a circuit board 251 of the second board 250. It is an aspect of this embodiment that the second board 250 is connected to a certain type of network, i.e., connected to a network that is not connected to the first data processing unit 220. According to the present embodiment, the second data processing unit 260 is connected to the wireless network W. If the second data processing unit 260 is connected to the wireless network W, the second board 250 may be connected to the wireless network W through a separate wireless transmitting and/or receiving device, such as an antenna A connected to a connecting port 219, which is separately provided on the first board 210, or through an embedded antenna (not shown) in the substrate 251, which is not exposed external to the printer 100. However, the above described connections are not limited to the above configurations only, but may be connected in any manner which serves the intended purpose of the present invention. In this embodiment, the second board 250 comprises a tuner-type second connecting port 280, and the second connecting port 280 is to connect the second board 250 to a wireless network W by being connected through the third connecting port 219 (FIG. 3) of the first board 210 and through the signal exchange cable C (FIG. 3). An antenna A connected to the third connecting port 219 may preferably be a radio frequency (RF) antenna.

Meanwhile, the second link portion 270 is to connect the first and the second boards 210 and 250, respectively, to provide signal exchange, by being selectively connected to the first link portion 240. To this end, the first and the second link portions 240 and 270, respectively, can be constructed in various ways. For example, in this embodiment, the first and the second link portions 240 and 270 each comprise a connecting hole 245 formed in the first link portion 240, and a connecting protrusion 275 which protrudes from the second link portion 270. Alternatively, a remote distance connecting method using a separate generally-used signal exchange cable (not shown) can also be used. Meanwhile, with the connection of the first and the second link portions 240 and 270, respectively, having the connecting hole 245 and the connecting protrusion 275, the first and the second boards 210 and 250, respectively, are combined with each other tightly. When connecting the first and the second boards 210 and 250 in tight contact to provide signal-exchange, most of the electronic elements on the first board 210 are arranged on a side of the first board 210, while there is only the first link portion 240 that is arranged on the other side (i.e., the side shown in FIG. 3) to make connecting the first and the second boards 210 and 250, respectively, easier.

With the network interface device 200 in which the first and the second boards 210 and 250, respectively, are connected by the connecting protrusion 275 and the connecting hole 245, as shown in FIG. 3, a fixing unit is additionally provided to ensure stable connection of the first and the second boards 210 and 250, respectively. According to the present embodiment, the network interface device 200 has a fixing bracket 290 as the fixing unit, which is removably connected to the first board 210. The fixing bracket 290 is fixed to the first board 210 by the connection of a plurality of elastic protrusions 293 and 295, respectively, and connecting holes 213, and with the connection of the elastic protrusions 293 and 295, respectively, and the connecting holes 213, the second board 250 is pushed into tight contact with the first board 210.

The operation of the network interface device 200 constructed as described above and according to the embodiment of FIGS. 3 and 4 will be described below.

First, in a case that there is only the first board 210 mounted in the printer 100, the first data processing unit 220 is connected to the wired network E through the first port 217, and becomes capable of signal exchange with the printer control unit 120 through the first connecting terminal 215. More specifically, in the case of the present embodiment in which the first board 210 is mounted in the printer 100, which transmits and receives signals in accordance with protocol different from a general computer (not shown), the auxiliary control unit 230 is additionally provided to the first data processing unit 220 to provide signal exchange between the printer control unit 120 and the data processing unit 220. In this case, the auxiliary control unit 230 transforms the input signals from the wired network E into print control signals, and outputs the transformed signals to the printer control unit 120. Accordingly, there is no need to install a control unit (not shown) in the printer 100, which is usually complex, to transform the signals, and therefore the printer 100 can be provided at an economic cost for the places that do not require connection to networks.

Meanwhile, when the first and the second boards 210 and 250, respectively, are mounted in the printer 100 in connection with each other, the wired network E and the printer 100 are connected in the same way as connecting the first board 210 to the printer 100 while the wireless network W and the printer 100 are connected through a second port 280. In other words, as the second data processing unit 260 is connected with the wireless network W through the second port 280, the wireless network W is connected with the printer 100 to provide mutual signal exchange. Meanwhile, the second board 250 can receive power supplied from the printer 100 via the first and the second link portions 240 and 270, respectively. In this case, the second data processing unit 260 is connected to the printer control unit 120 sequentially through the second link portion 270, the first link portion 240 and the first connecting terminal 215. If the first and the second boards 210 and 250, respectively, are mounted in the printer 100 in connection with each other as in the present embodiment, it is an aspect of this embodiment that the first data processing unit 220 is arranged on a signal transmission path that connects the first link portion 240 with the first connecting terminal 215 so that the second data processing unit 260 and the first connecting terminal 215 are controlled by the first data processing unit 220.

As described above, when the printer 100 is connected to the wired and wireless networks E and W, respectively, it is an aspect of the invention that the same network address, i.e., the same IP address, is allocated to the printer 100 with respect to the respective networks E and W. By doing so, maintenance requirements for the networks with a plurality of IP addresses of the printer 100 can be reduced. According to the present embodiment, the first data processing unit 220 further comprises an address manage unit 227, and the address manage unit 227 causes the same IP address to be given to the second data processing unit 260 and to the first data processing unit 220.

When the same IP address is allocated to the first and the second boards 210 and 250, respectively, the first data processing unit 220 temporarily stores the signals received through the respective ports 217 and 280, respectively, in a sequential order. The first data processing unit 220 keeps the signal from the other network waiting until the signal exchange between one network with the printer control unit 120 is completed. Then with the completion of the signal exchange, the first data processing unit 220 controls signal exchange between the printer control unit 120 with a corresponding network so as to attend to the signals being inputted through the other port. Since the same network address is given both for the wired and wireless networks, malfunction of the printer 100 due to redundant reception of signals through the first and the second data processing units 220 and 260, respectively, can be prevented.

Meanwhile, with respect to the network interface device 200 according to the embodiment of FIGS. 3 and 4, it is an aspect of the invention that the first and the second boards 210 and 250, respectively, are provided with a single physical address, i.e., a single Media Access Control (MAC) address. To this end, the first data processing unit 220 controls the second data processing unit 260 so that the MAC address, which is stored in the memory 225, is provided to the first and the second boards 210 and 250, respectively. As a result, even in the complex function in which the first and the second boards 210 and 250, respectively, connect the printer 100 to the plurality of networks E and W, respectively, the first and second boards 210 and 250, respectively, can be controlled as one body, and therefore, maintenance becomes easier.

Figure 5:
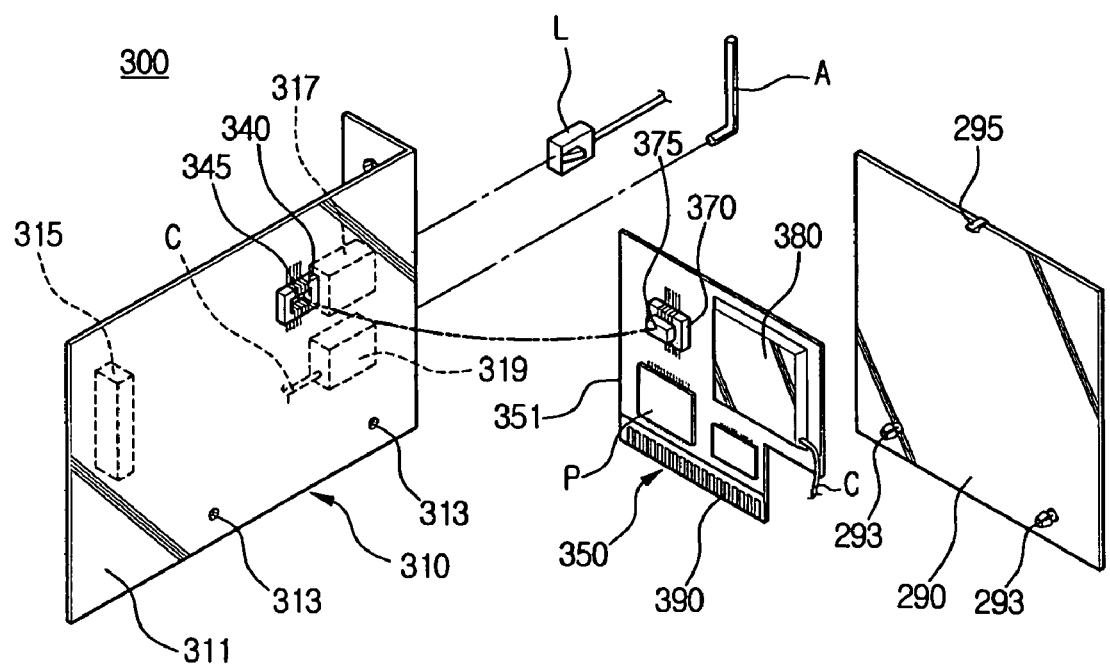
FIG. 5 is an exploded perspective view of a network interface device according to another embodiment of the present invention.
Figure 6:
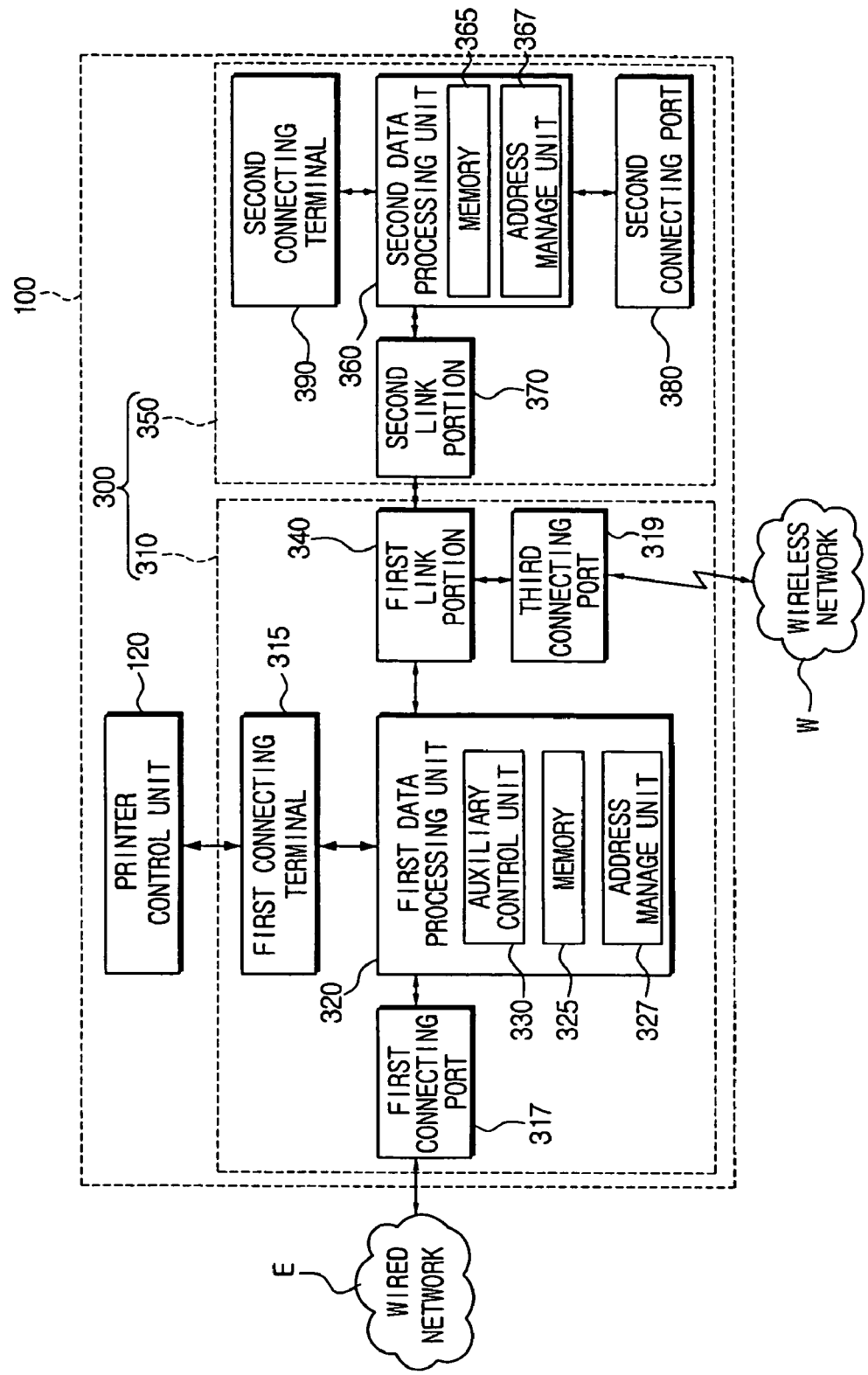
FIG. 6 is a block diagram illustrating the network interface device of FIG. 5.

FIG. 5 shows the appearance of a network interface device according to another embodiment of the present invention, and FIG. 6 shows the structure of the network interface device according to the embodiment of FIG. 5.

Referring to FIGS. 5 and 6, the network interface device 300 according to this embodiment is distinguished from the previous embodiment mainly in the facts that the second board 350 can be independently connected to the connecting slot 118 (FIG. 2) of the printer 100, or can be installed in other electronic devices such as a computer (not shown) which is capable of signal exchange according to a protocol different from the printer 100.

In order to accomplish the above aspects, the second board 350 of the network interface device 300 according to this embodiment further comprises a second connecting terminal 390. The second connecting terminal 390 may be constructed in the same way as the first connecting terminal 315, or can be constructed for the signal exchange in accordance with a protocol which is different from the first connecting terminal 315.

According to this embodiment, the first board 310 further comprises a third port 319. The third port 319 is connected to the second board 350 via a separate cable C to be able to transmit and receive signals with the second data processing unit 360. Albeit not shown, the third port 319 can be connected with the second data processing unit 360 sequentially through the first data processing unit 320 and the first and the second link portions 340 and 370, respectively.

Accordingly, if it is impossible to install the second connecting port 380 on the second board 350 due to a limited installation environment of the network interface device 300, or if it is impossible to use the second port 380 installed on the second board 350, the second data processing unit 360 can be connected with the other external networks by an indirect route, i.e., through the third port 319. To this end, when the second data processing unit 360 is connected with the wireless network W, the third port 319 is constructed to be connected with a separate transceiver, such as an antenna A, which corresponds to the signal transmission and/or reception mode of the wireless network, and when the second data processing unit 360 is connected with the wired network E, the third connecting port 319 is constructed to be a connecting port for a wired network, such as an RJ-45 JACK.

Meanwhile, according to this embodiment, considering the fact that the second board 350 is independently mounted on the electronic device of another network to be used, the second data processing unit 360 may further include a memory 365 and an address manage unit 367. Accordingly, when the second board 350 is independently used for the network electronic device, the second board 350 can have a MAC address and an IP address which are different from the first board 310. In other words, the second board 350 can perform independent network interfacing. In the case that the first and the second boards 310 and 350, respectively, are used in connection with each other, the first data processing unit 320 controls the second data processing unit 360 so that the second board 350 is allocated with the same MAC address and the IP address as those of the first board 310. In either case, the same effect as obtained in the previous embodiment is guaranteed.

So far, the case is provided in which the first board is connected to the wired network while the second board is connected to the wireless network, as a network interface device for use in the network printer. However, this is just by way of an example, and one will appreciate that the present invention will not be limited to the described example only. Accordingly, the network interface device according to the present invention can be adapted to various network electronic devices, and also, the first board can be connected to the wireless network while the second board is connected to the wired network. Further, the first and the second link portions are not limited to the above-described forms of protrusions and holes, but can be modified in various ways such as cable connection.

According to the embodiments of the present invention, a predetermined number of network interface devices 200 and 300 are provided and are capable of connecting to at least one of wired and wireless networks E and W, respectively, through a single connecting terminal 118 (FIG. 2) provided at the network electronic device 100. As a result, compactness of the network electronic device 100 can be obtained, manufacturing costs are reduced, and the unit price of the electronic device 100 is reduced because there is no need to separately purchase a network interface device 150 and 150' (FIG. 2) anymore.

Although a few preferred embodiments of the present invention have been described, it will be understood by those skilled in the art that the present invention should not be limited to the described preferred embodiments, but instead, various changes and modifications can be made within the spirit and scope of the present invention as defined by the appended claims.

What is claimed is:

1. An image forming apparatus comprising:
   a printing unit to print an image on a paper medium;
   a first board including:
   a first port to connect to a wired network;
   a first data processor to receive wired signals from a wired network via the first port and to process the wired signals received via the first port; and
   a first link portion;
   a second board including:
   a wireless unit including an antenna to wirelessly connect to a wireless ne[work and to receive wireless signals from the wireless network; and
   a second link portion coupled to the wireless unit, the second link portion detachably connectable to the first link portion of the first board to enable transmission of wireless signals from the second board to the first data processor in the first board, wherein the same physical address and the same IP address are allocated to the first and second boards when the first board and the second board are connected the by allocating the physical address of one of the boards to another one of the boards regardless of the physical address and the IP address of the first and second boards prior to connection, wherein the printing unit executes printing operations in accordance with print data obtained by processing signals received from either one of the wired and wireless networks using the same physical address and the same IP address.

2. The image forming apparatus of claim 1, wherein the second board comprises:
   a second data processor configured to process the other one of the wireless and wired networks, the second data processor capable of communicating data with the first data processor of the first board when the second board is connected to the first board.

3. The image forming apparatus of claim 2, further comprising a fixing unit to prevent movement of the second board with respect to the first board during the connecting of the first and second boards.

4. The image forming apparatus of claim 3, wherein the fixing unit comprises a fixing bracket which is removably connected to the first board, and said second board is pressed toward the first board by the fixing bracket.

5. The image forming apparatus of claim 1, wherein mounted on a side of the first board are the first data processor, and electronic elements being connected with the first data processor to provide signal exchange, and mounted on the other side of the first board is a first link portion for removably connecting to the second board.

6. The image forming apparatus of claim 2, wherein the first port connects to the one of the wireless and wired networks which is connected with the first data processor, and a second port connects to the other one of the wireless and wired networks which is connected with the first data processor.

7. The image forming apparatus of claim 2, wherein the image forming apparatus is a printer, and
   the first data processor comprises,
   an auxiliary control unit to process signals received from one of the wired and wireless networks and output the processed signals via the first connecting terminal, and to process signals received from the second board into a printing control signal and output the processed signals,
   a memory to store a physical address of the first board, and
   an address manage unit to manage the IP address allocated to the first and second boards such that the same physical address and the same IP address are allocated to the first and second boards when the first board and the second board are connected.

8. The image forming apparatus of claim 1, wherein the second board comprises a second connecting terminal for detachably connecting with the image forming apparatus.

9. The image forming apparatus of claim 1, wherein the first data processor is connected with the wired network, and a second data processor is connected with the wireless network.

10. The image forming apparatus of claim 6, wherein: the first port is configured to receive a first data through a wired network, and wherein the second port is configured to receive a second data through a wireless network.

11. The image forming apparatus of claim 6, wherein: the first port and the second port are both disposed on the first board.

12. The image forming apparatus of claim 2, wherein the second board is supplied with a power source from the image forming apparatus.

13. The image forming apparatus of claim 6, wherein the first data processor temporarily stores the signals received through the first and second port in a sequential order, and keeps the signals from the other network waiting until a pending signal exchange between one network with the image forming apparatus print control is completed.

14. The image forming apparatus of claim 1, wherein the first unit further includes a first connecting terminal coupled to the first data processor to connect to the printing unit.

15. The image forming apparatus of claim 1, wherein the wireless unit includes a processor to process the wireless signals received from the wireless unit to generate processed wireless data.

16. A network interface device to facilitate transfer of data between wired or wireless networks and an image forming apparatus, comprising: a first board including:
a first port to connect to a wired network; a first data processor to receive wired data from at least one external wired communication network via the first port and to process the wired data to produce processed wired data;
a first link portion; and
a first connecting terminal coupled to the first data processor to removably connect with the image forming apparatus; and
a second board including:
a wireless unit including an antenna to wirelessly connect to a wireless network;
a second data processor to receive wireless data from at least one external wireless communication network via the wireless unit and to process the wireless data to produce processed wireless data; and
a second link portion detachably attached to the first link portion of the first circuit board so as to establish a communication link between the first board and the second board,
wherein the first data processor is configured to process signals received from the one of the wired and wireless networks and output the processed signals via the first connecting terminal, and to process signals received from the second board and output the processed signals via the first connecting terminal,
wherein the first processor is configured to manage an IP address allocated to the first and second boards such that the same physical address and the same IP address are allocated to the first and second boards when the first board and the second board are connected by allocating the physical address of one of the boards to another one of the boards regardless of the physical address and the IP address of the first and second boards prior to connection.

17. The network interface device of claim 16, wherein the first data processor further comprises an address manage unit which causes the same network address to be given to the second data processor and to the first data processor.

18. The network interface device of claim 16, wherein when the same network address is allocated to the first and the second circuit boards, the first data processor temporarily stores information from the signals received through the first connecting port and the wireless unit in a sequential order.

19. The network interface device of claim 16, wherein the image forming apparatus is a printer.

20. An image forming apparatus comprising:
a printer control unit; and
a network interface device removably coupled to the printer control unit to facilitate communication with at least one of a wireless network and a wired network, the network interface including a first unit and a second unit connected to each other, the first unit including a processor configured to process signals received from a wired network, the second unit configured to receive signals from a wireless network and transmit the received signals to the processor of the first unit such that signal exchange between the wireless network and the first unit is facilitated,
wherein the processor of the first unit manages an IP address allocated to the first and second units such that a same physical address and the same IP address are allocated to the first and second units when the first unit and the second unit are connected by allocating the physical address of one of the units to another one of units regardless of the physical address and the IP address of the first and second units prior to connection.

21. The image forming apparatus according to claim 20, wherein signals received via the network interface device are converted into print control signals and transmitted to the printer control unit.

* * * * *